US008069765B2

(12) United States Patent
McIntosh et al.

(10) Patent No.: US 8,069,765 B2
(45) Date of Patent: Dec. 6, 2011

(54) STAND FOR SUPPORTING A HAND-HELD POWERED OPERATED BAND SAW

(75) Inventors: Scott A. McIntosh, Commerce, MI (US); John L. Wate, Holly, MI (US); Jeffrey A. Scott, Fenton, MI (US)

(73) Assignee: Stout Tool Corp., Livonia, MI (US)

( * ) Notice: Subject to any disclaimer, the term of this patent is extended or adjusted under 35 U.S.C. 154(b) by 307 days.

(21) Appl. No.: 11/593,209

(22) Filed: Nov. 6, 2006

(65) Prior Publication Data

US 2007/0101851 A1    May 10, 2007

Related U.S. Application Data

(60) Provisional application No. 60/736,010, filed on Nov. 10, 2005.

(51) Int. Cl.
*B27B 19/12* (2006.01)
*B27B 11/00* (2006.01)
(52) U.S. Cl. .............................. 83/788; 83/772; 83/778
(58) Field of Classification Search ................. 83/778, 83/772, 773; 248/676
See application file for complete search history.

(56) References Cited

U.S. PATENT DOCUMENTS

| 1,280,341 | A | * | 10/1918 | Wardman | 83/98 |
|---|---|---|---|---|---|
| 2,786,500 | A | * | 3/1957 | Unterfranz | 144/285 |
| 2,990,859 | A | * | 7/1961 | Ruben | 83/473 |
| 3,060,979 | A |  | 10/1962 | Hanvin | 143/132 |
| 3,117,600 | A |  | 1/1964 | Davis | 143/70 |
| 3,285,303 | A | * | 11/1966 | Kwiatkowski | 83/477.1 |
| 3,385,330 | A |  | 5/1968 | Haynes | 143/6 |
| 3,803,775 | A |  | 4/1974 | Demeules | 51/241 R |
| 3,905,263 | A |  | 9/1975 | Smith | 83/477.2 |
| 4,209,045 | A | * | 6/1980 | Bassett | 144/48.7 |
| 4,252,239 | A | * | 2/1981 | Snyder | 206/349 |
| 4,269,098 | A | * | 5/1981 | Fogle | 83/733 |
| 4,335,765 | A |  | 6/1982 | Murphy | 144/286 R |
| 4,483,573 | A |  | 11/1984 | Keller | 312/281 |
| 4,653,371 | A | * | 3/1987 | Vancalbergh | 83/464 |
| 4,658,689 | A | * | 4/1987 | Yakich | 83/801 |
| 4,677,887 | A |  | 7/1987 | Martin | 83/788 |

(Continued)

OTHER PUBLICATIONS

International Search Report with Written Opinion dated Aug. 12, 2008, from the corresponding International Patent Application No. PCT/US2006/043616.

*Primary Examiner* — Ghassem Alie
*Assistant Examiner* — Bharat C Patel
(74) *Attorney, Agent, or Firm* — Young Basile

(57) ABSTRACT

A method and apparatus for converting a portable band saw to an upright stationary table band saw includes a stand having a base, at least one vertically extending side wall, and a top. A work piece support surface can include an opening through which one run of a closed loop saw blade of the portable band saw can pass when the portable band saw is mounted in a supporting relationship with respect to the stand. A switch mounted on the stand operates the portable band saw independent of the finger trigger on the handle. The on/off switch is connected to a plug engaged by the portable band saw when mounted in the stand. The plug is engagable within a socket of the band saw and is electrically connected to bypass the finger trigger of the portable band saw and to create a circuit through the on/off switch.

3 Claims, 10 Drawing Sheets

U.S. PATENT DOCUMENTS

| | | | |
|---|---|---|---|
| 4,823,666 A | 4/1989 | Galloway | 83/788 |
| 5,251,525 A * | 10/1993 | Galloway | 83/574 |
| 6,467,176 B1 | 10/2002 | Frech et al. | 30/392 |
| D522,828 S | 6/2006 | Brazell et al. | D8/64 |
| 7,077,179 B1 * | 7/2006 | Camiano et al. | 144/286.1 |
| 7,159,499 B1 * | 1/2007 | Lanser | 83/796 |
| 2002/0040530 A1 * | 4/2002 | Crawley | 30/380 |
| 2004/0158996 A1 | 8/2004 | McIntosh | 30/380 |
| 2005/0183559 A1 | 8/2005 | Rue | 83/574 |
| 2006/0118012 A1 * | 6/2006 | Katz | 108/129 |

* cited by examiner

STAND FOR SUPPORTING A HAND-HELD POWERED OPERATED BAND SAW

CROSS-REFERENCE TO RELATED APPLICATIONS

This application claims the benefit of Provisional Patent Application Ser. No. 60/736,010 filed on Nov. 10, 2005.

FIELD OF THE INVENTION

The present invention relates in general to a portable hand held power operated band saw, and more particularly, to an apparatus and method for supporting a portable hand held power operated band saw in a stand.

BACKGROUND

Various conversion kits and stands for portable band saws are known, for example see U.S. Pat. No. 5,251,525; U.S. Pat. No. 4,823,666; U.S. Pat. No. 4,677,887; U.S. Design 522, 828; and U.S. Published Application No. 2002/0040530 A1. While these devices appear suitable for their intended purpose, the devices remain difficult and costly to manufacture, while being inconvenient to setup and operate in a construction work environment. Therefore, it would be desirable to provide a portable band saw stand, or conversion kit, that was easy to manufacture. It would be desirable to provide a portable band saw stand, or conversion kit, that was cost effective to manufacture. It would be desirable to provide a portable band saw stand, or conversion kit, that was easy to setup in a construction work environment. It would be desirable to provide a portable band saw stand, or conversion kit, that was easy to operate in a construction environment. It would be desirable to provide a combination portable band saw and stand kit that can be used separately or assembled together for greater flexibility in a construction environment. It would be desirable to provide an apparatus and method suitable for use in a construction environment to reduce repetitive motion work related injuries, such as carpel tunnel syndrome.

SUMMARY

The present invention relates to an apparatus for converting a portable band saw to an upright stationary table band saw including a stand having a base, at least one vertically extending side wall associated with the base, a top supported by the side wall, and a work piece support surface associated with the top. The work piece support surface can have an opening therein through which one run of a closed loop saw blade of the portable band saw can pass when the portable band saw is mounted in a supporting relationship with respect to the stand. A releasable clamp can hold the band saw in place with respect to the stand.

A portable band saw stand according to an embodiment of the present invention can include a stand for holding a portable band saw against the force of gravity. The stand can include a relatively flat work piece engaging surface, wherein the saw blade projects through a plane of the work piece engaging surface. The work piece engaging surface can contact the work piece and provide support for the work piece to be moved across the work piece engaging surface while being fed through the saw blade.

A saw and stand in combination according to an embodiment of the present invention can include a portable hand-held power operated band saw manipulable by hand so as to be movable in relation to a work piece for performing a cutting operation on the work piece with a closed loop saw blade having a substantially continuous cutting edge on at least one edge of the saw blade. The saw blade is movable in a path defined by the closed loop during the cutting operation. A stand can be provided for holding the portable band saw against the force of gravity. The stand can have a relatively flat work piece engaging surface, wherein the saw blade projects through a plane of the work piece engaging surface. The work piece engaging surface can contact the work piece and provide support for the work piece to be movable across the work piece engaging surface while being fed through the saw blade.

A method according an embodiment of the present invention for mounting a portable band saw in a stand can include providing a portable hand-held power operated band saw manipulable by hand so as to be movable in relation to a work piece. The band saw can have a substantially continuous cutting edge on at least one edge of the saw blade. The saw blade can be movable in a path defined by the closed loop during the cutting operation. The method can also include providing a stand having a relatively flat work piece engaging surface, wherein the saw blade projects through a plane of the work piece engaging surface. The work piece engaging surface can contact the work piece and provide support for the work piece to be movable across the work piece engaging surface while being fed through the saw blade. The method can also include inserting the portable band saw into supporting relationship with respect to the stand with the portable band saw located within a complementary shaped recess formed in the stand.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
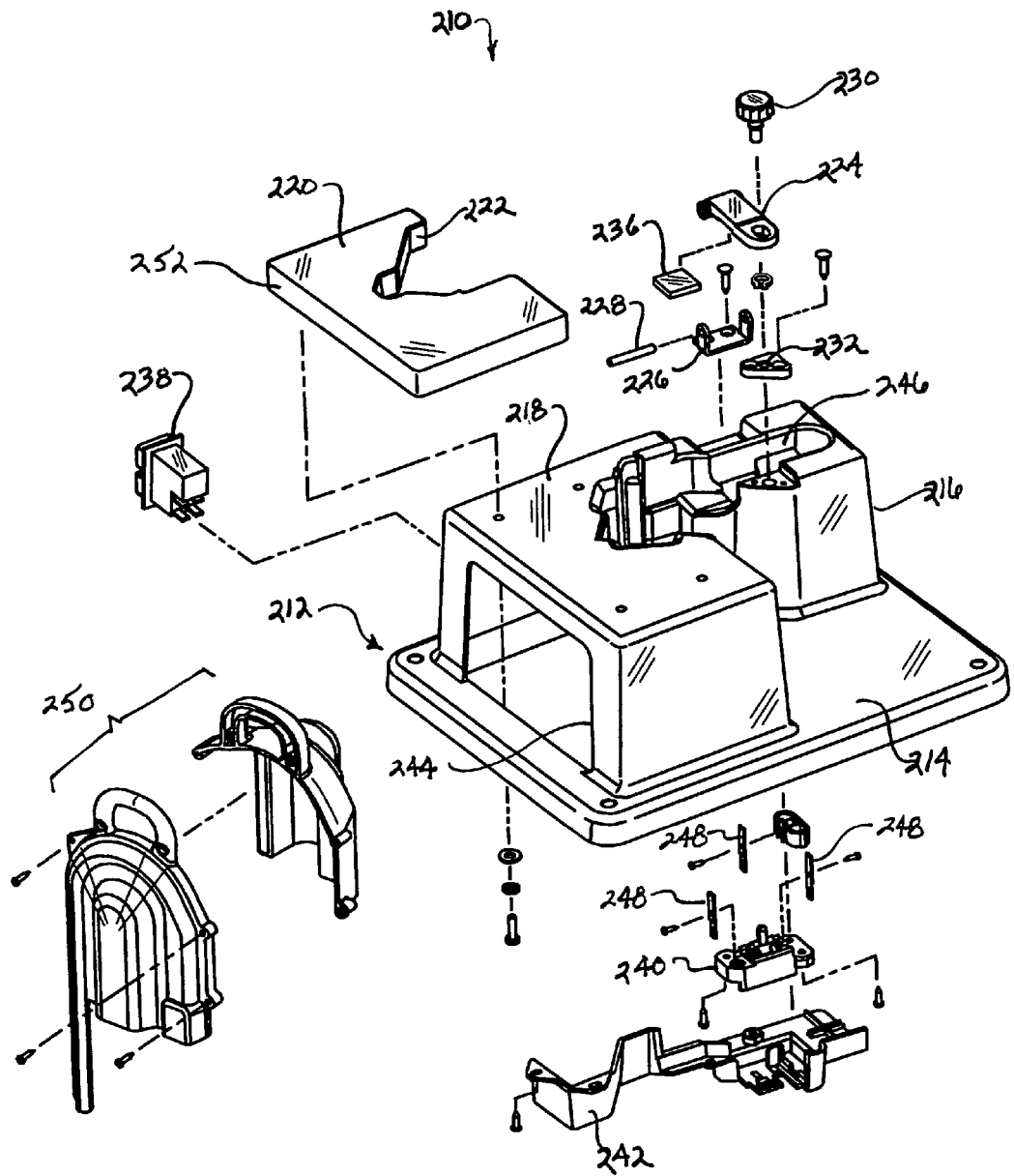
FIG. 1 is a perspective exploded view of a portable hand-held band saw stand according to an embodiment of the present invention.
Figure 2:
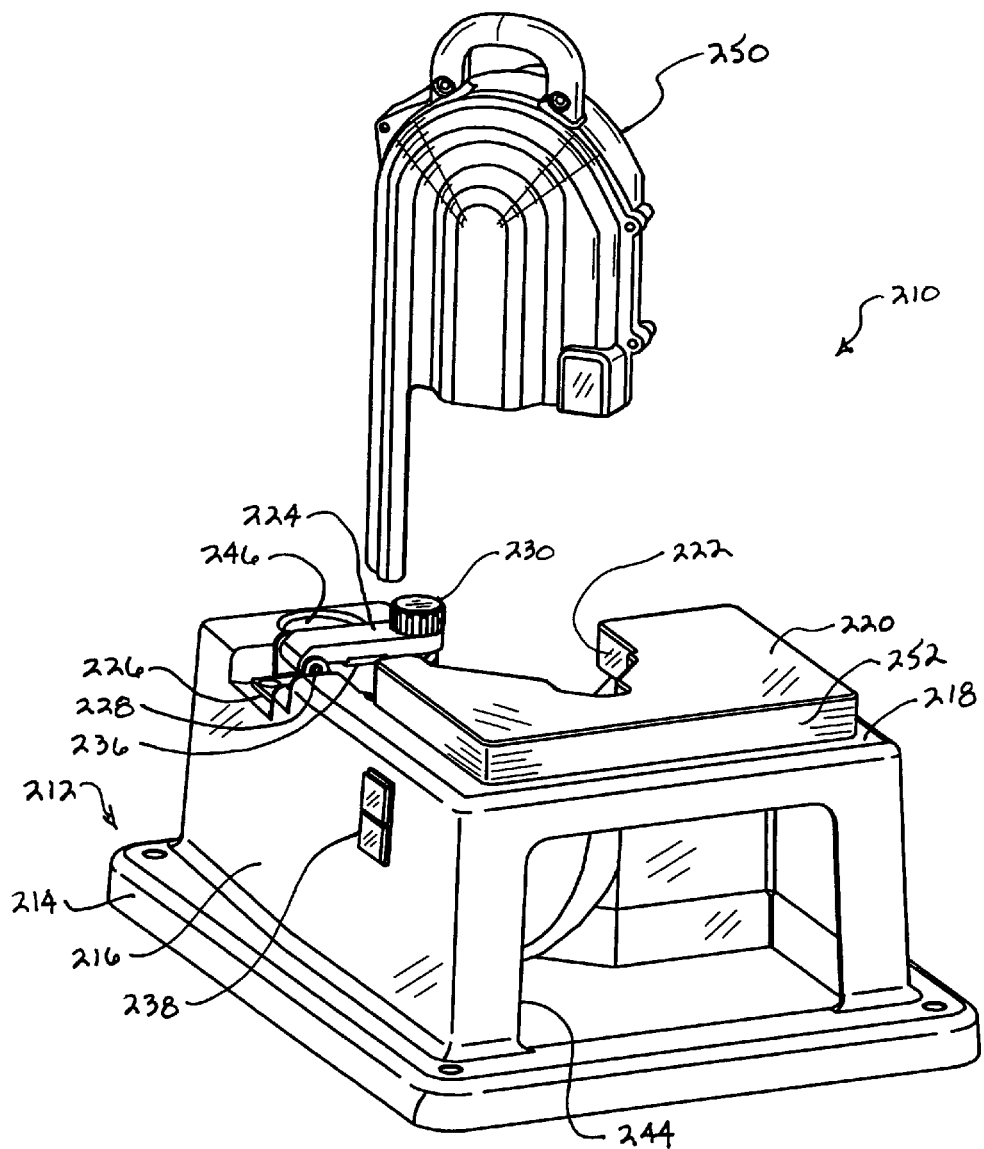
FIG. 2 is a perspective view of the portable hand-held band saw stand illustrated in FIG. 1.
Figure 3:
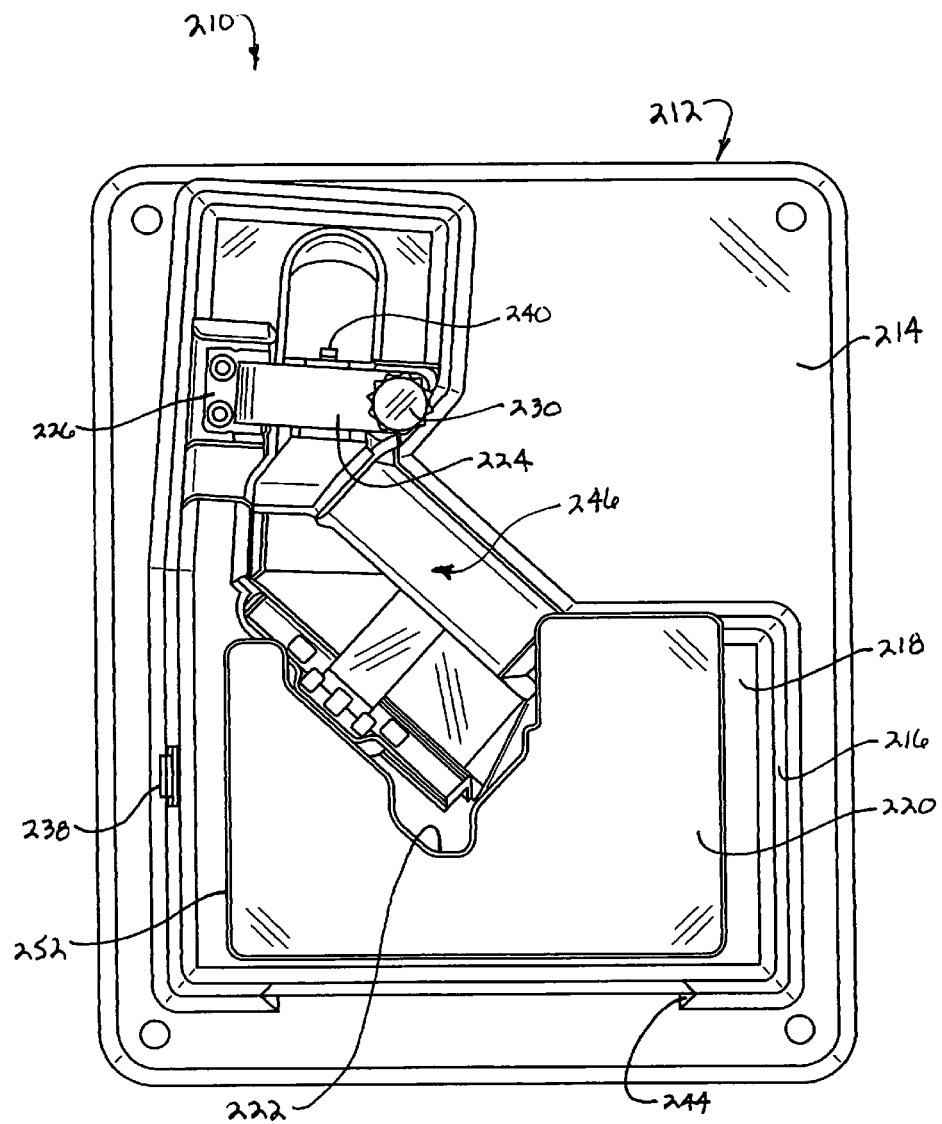
FIG. 3 is a plan view of the portable hand-held band saw stand illustrated in FIG. 1.

Referring now to FIGS. 1-3, an apparatus 210 for converting a portable band saw to an upright stationary table band saw can include a stand 212 having a base 214, at least one vertically extending side wall 216 associated with the base 214, and a top 218 supported by the side wall 216. A work piece support surface 220 can be associated with the top 218. The work piece support surface 220 can include an opening or recess 222 formed therein through which one run of a closed loop saw blade 150 of the portable band saw 50 can pass when the portable band saw is mounted in a supporting relationship with respect to the stand 212. A releasable clamp 224 is movable between a released position allowing insertion and removal of the portable band saw with respect to the stand 212, and a clamped position for holding the portable band saw in place with respect to the stand 212. The releasable clamp 224 can be connected by a suitable bracket 226 and pivot pin 228 to the stand 212 for pivoting movement. The releasable clamp 224 can include a fastener 230, such as a thumb screw or any other suitable configuration for releasibly holding the clamp 224 in the clamped position with respect to the stand 212. A threaded aperture 232 can be provided associated with the stand 212. If desired, a compressible pad 236 can be provided on an inner surface of the clamp 224 to hold the portable band saw firmly in place with respect to the stand without damaging the surface of the portable band saw with the clamp 224.

Figure 10:
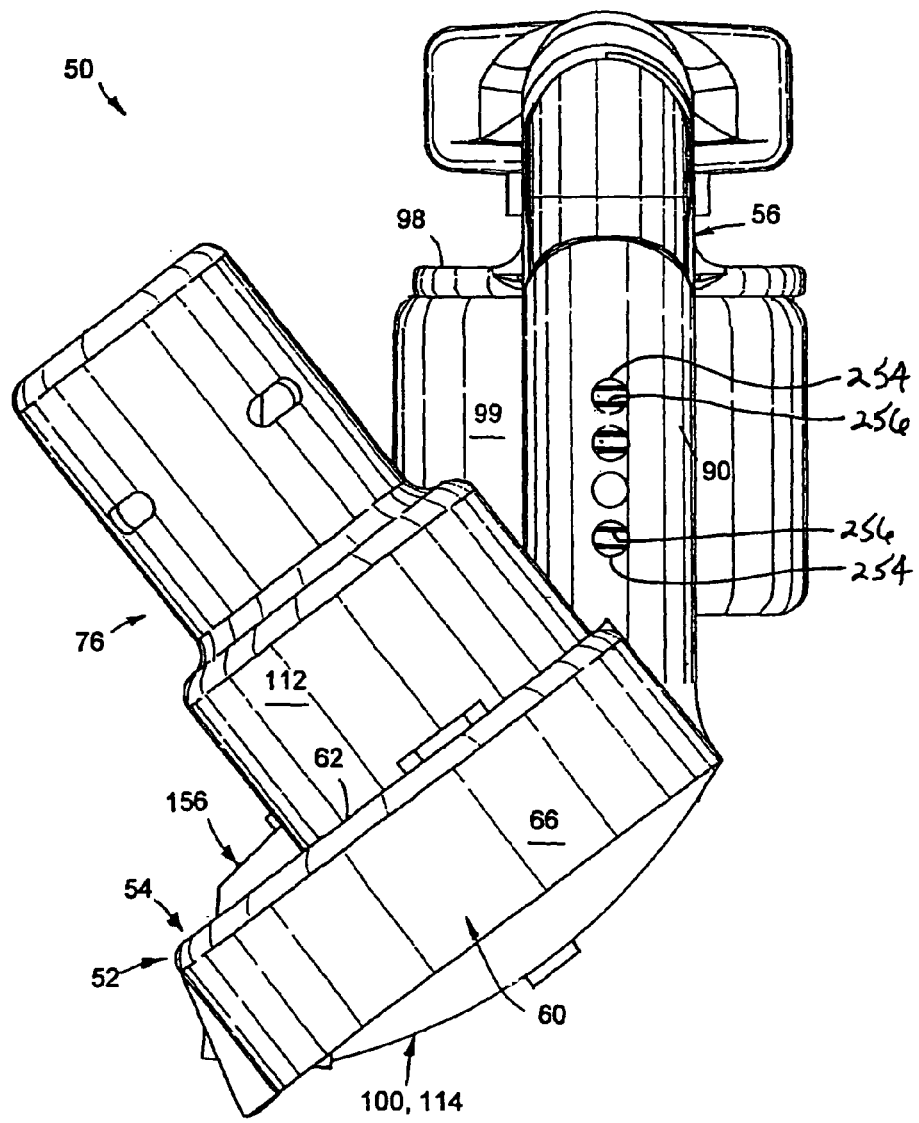
FIG. 10 is an opposite end view of the portable band saw illustrated in FIG. 4 according to an embodiment of the present invention.

The stand 212 includes an on/off switch 238 for operating the band saw when mounted in a supporting relationship with respect to the stand 212. The on/off switch 238 is connected to a plug 240 by suitable wiring enclosed by wiring cover 242. The plug 240 is engagable within a socket 254 (FIG. 10) of the portable band saw 50, which is considered to be a direct electrical connection, when the portable band saw is mounted in a supporting relationship with respect to the stand 212. The plug 240 when electrically connected bypasses a finger trigger 96 (FIGS. 7-8) of the portable band saw 50 and creates a circuit through the on/off switch 238 mounted to the stand 212. As an alternative, the band saw may use a cord and plug for electrically connecting the saw to an electrical outlet.

The stand 212 can include a foot recess 244 for holding the stand 212 in a stationary position while performing a cutting operation on a work piece with the portable band saw mounted in supporting relationship to the stand 212. The stand 212 can also include a contoured recess 246 in the upper surface or top 218 for substantially enclosing a lower portion of the portable band saw to be mounted in a supporting relationship with the stand 212. The contoured recess 246 has a complementary shape with respect to the lower portion of the portable band saw to be engaged therein in order to firmly engage an outer peripheral surface of the portable band saw along at least a portion of its lower end when mounted in a supporting relationship with the stand 212. A suitably non-threaded clamp may be used to secure the saw in place.

Figure 7:
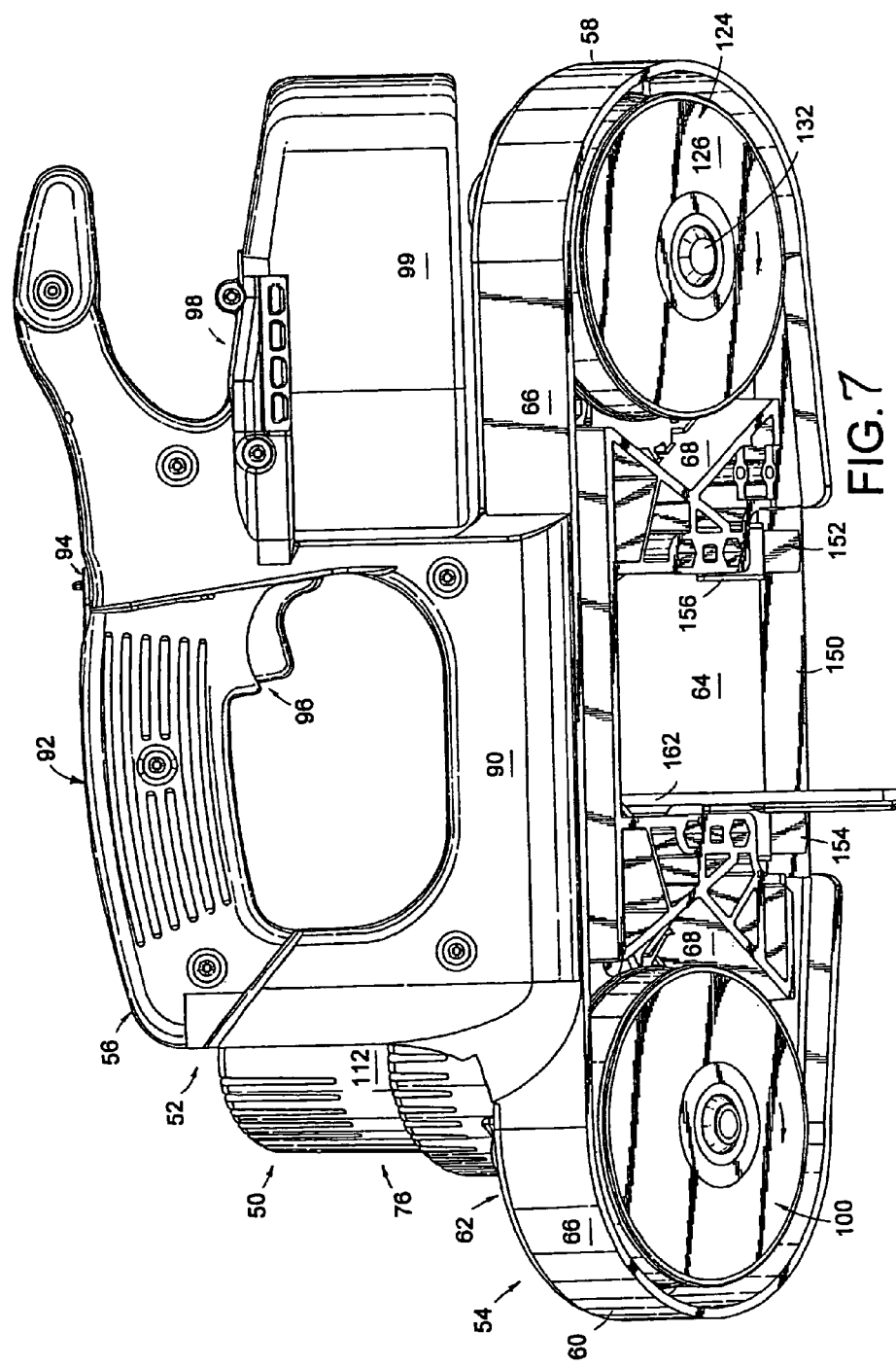
FIG. 7 is a side view of the portable band saw illustrated in FIG. 4 according to an embodiment of the present invention.
Figure 8:
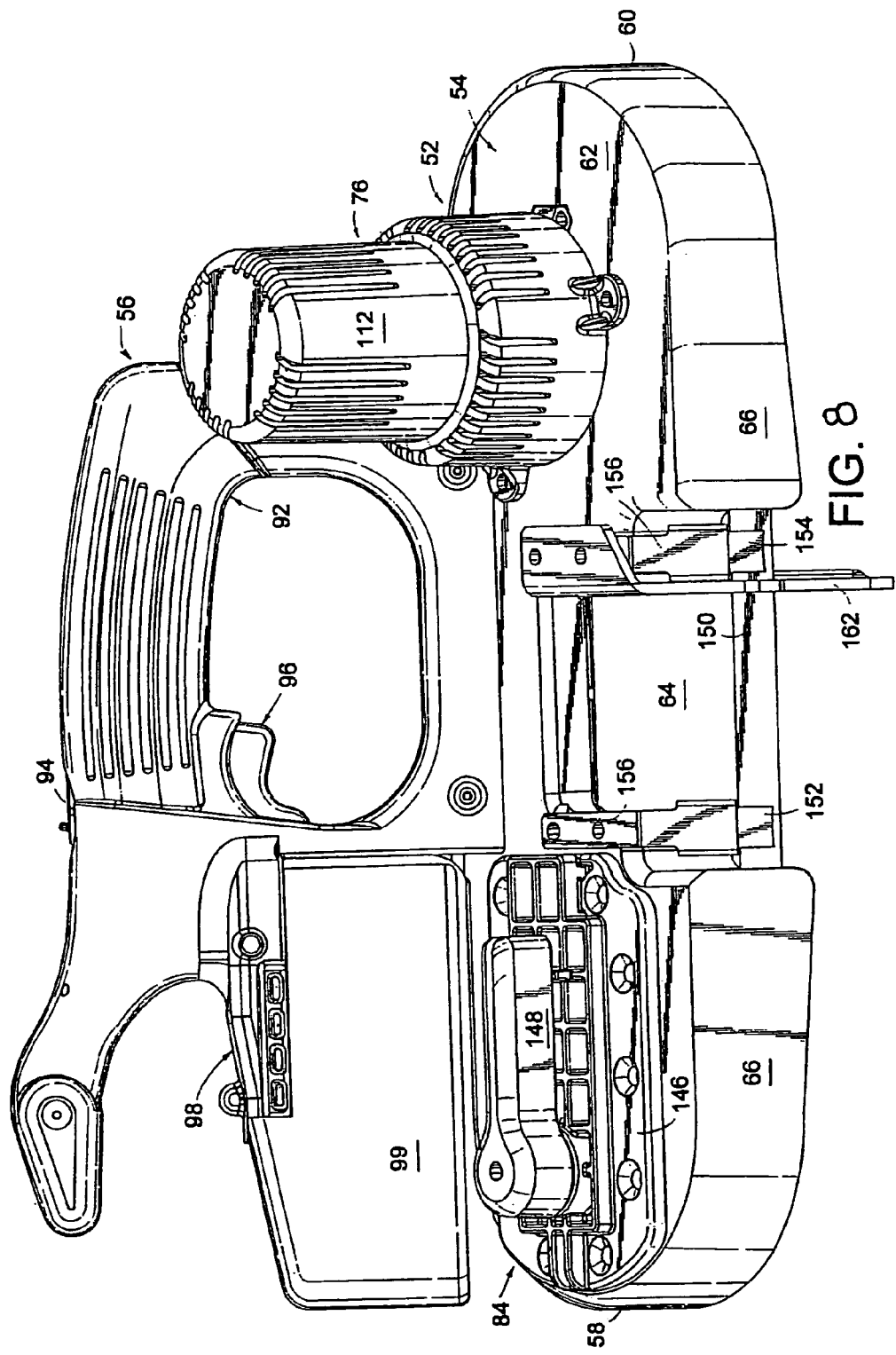
FIG. 8 is an opposite side view of the portable band saw illustrated in FIG. 4 according to an embodiment of the present invention.
Figure 9:
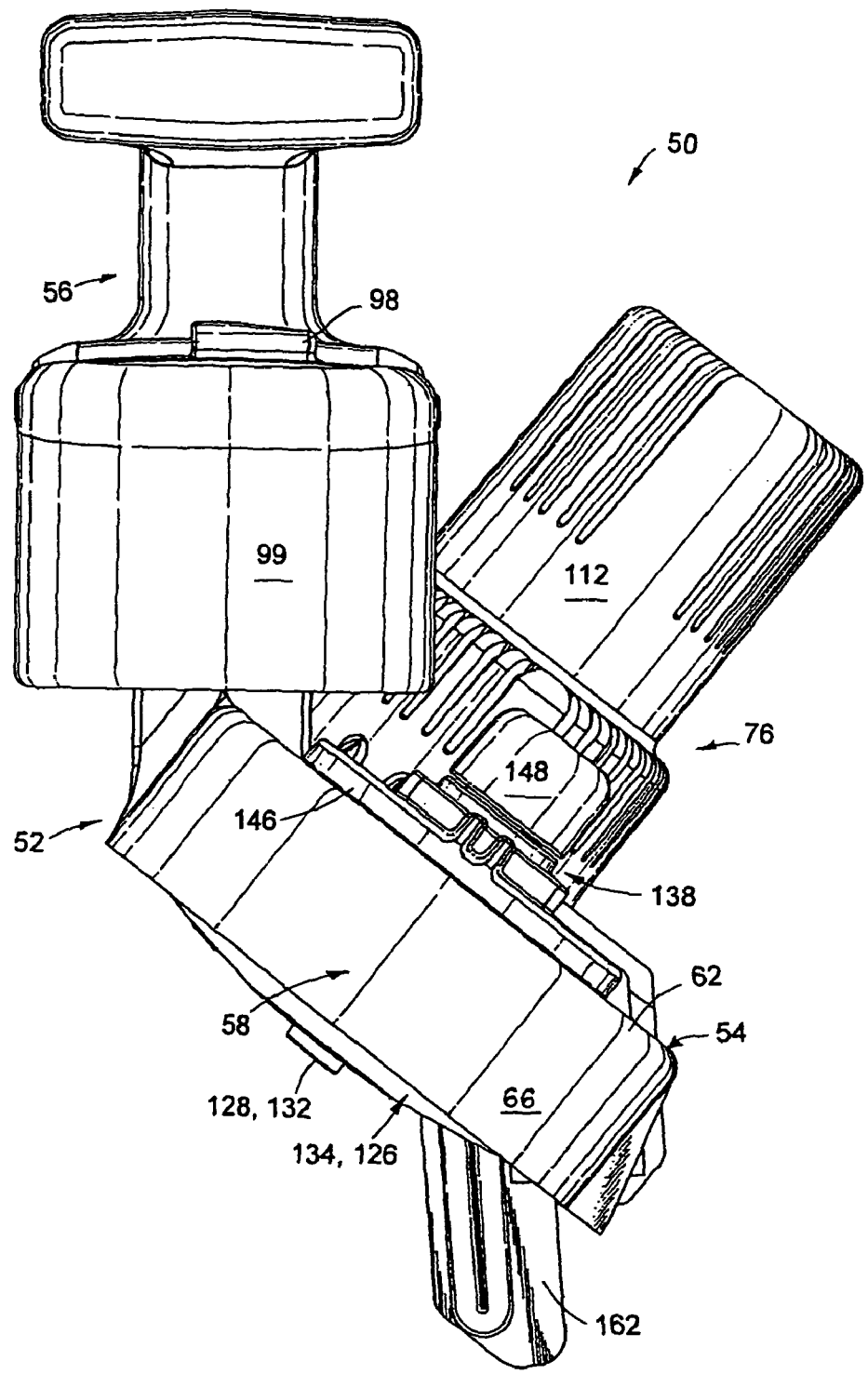
FIG. 9 is an end view of the portable band saw illustrated in FIG. 4 according to an embodiment of the present invention.

Preferably, the opening 222 in the support surface 220 is complementary in size and shape to the fence 162 (FIGS. 7-10) extending substantially parallel to an orientation of the band saw blade section traversing a throat and plane of the handle 92 (FIG. 7). The fence 162 preferably achieves a generally planar orientation with the work piece support surface 220 when the portable band saw is fully inserted and mounted within the complementary shaped, contoured recess 246 formed in the top 218 of the stand 212. In this orientation, the clamp 224 can be pivoted from the released position to the clamped position and the fastener 230 threadibly engaged within the threaded aperture 232 of the stand 212 in order to securely hold the portable band saw in place with respect to the stand 212. The plug 240 can include a plurality of prongs or protuberances 248 engagable within complementary shaped recesses 256 (FIG. 10) formed within the socket 254 of the portable band saw 50 when mounted in a supporting relationship with respect to the stand 212.

The portable band saw stand 212 can be provided with a housing cover 250 shaped to fit over at least one pulley mounted on the portable band saw 50 to afford protection for a user of the band saw. The housing cover can be shaped to slideably engage over one end of the portable band saw to enclose at least one pulley mounted on the portable band saw along with a corresponding portion of the continuous loop band saw blade. The housing cover 250 can be of sufficiently close complementary contour or shape in order to snugly fit over an end of the portable band saw without requiring additional fasteners or attachments between the housing cover 250 and the portable band saw. When the housing cover 250 is assembled over the outer end of a portable band saw mounted in a supporting relationship with respect to the stand 212, the only portion of the continuous loop a band saw blade exposed is in the throat area of the portable band saw extending generally perpendicular to the fence 162 and the work piece support surface 220.

A metal plate 252 can be connected to the top 218 of the stand 212 to define the relatively flat work piece engaging surface 220. The metal plate 252 can provide superior resistance to harsh working conditions in a construction environment. The metal plate 252 also provides superior stability under heavy loads, scratch and ding resistance, and superior dimensional change resistance due to thermal fluctuation in the working environment.

Figure 4:
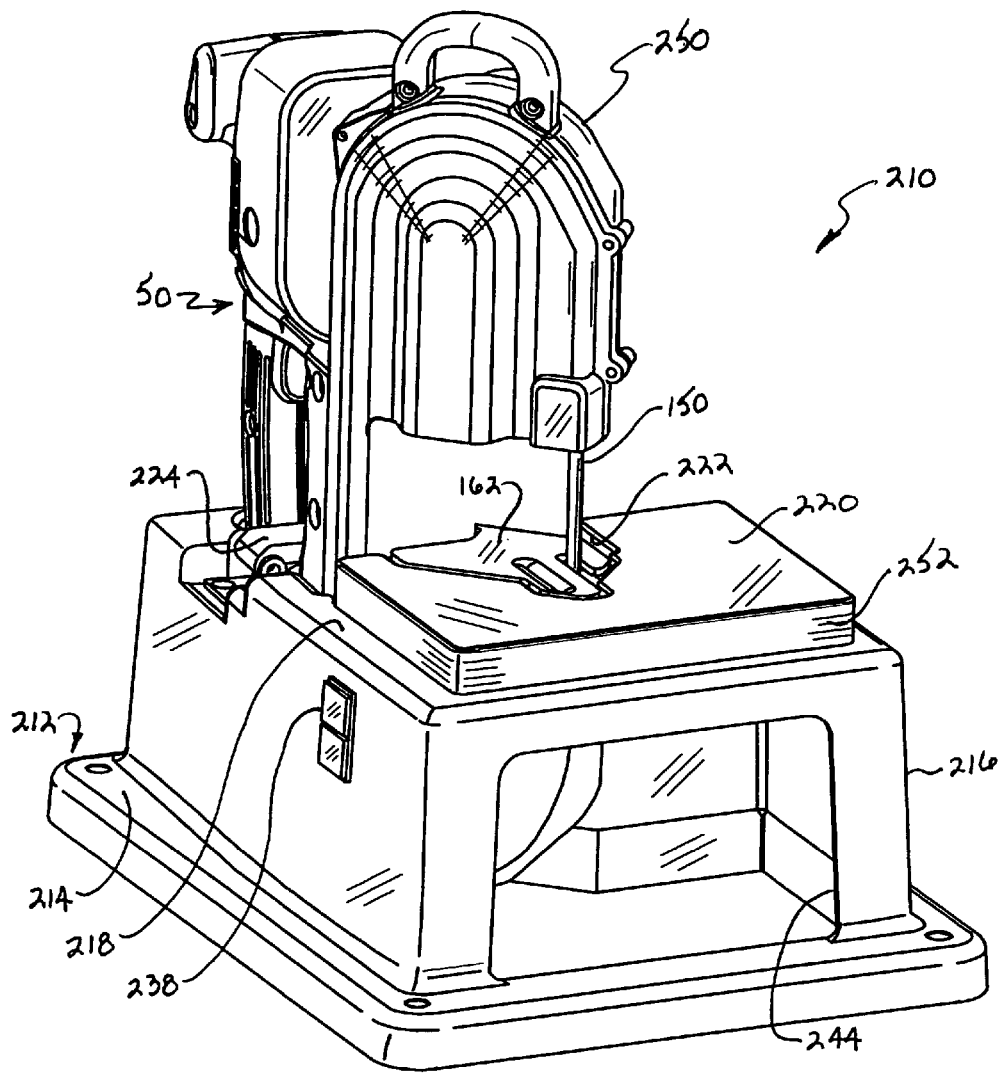
FIG. 4 is a perspective view of the portable band saw stand illustrated in FIG. 1 in combination with a portable band saw installed therein according to an embodiment of the present invention.
Figure 5:
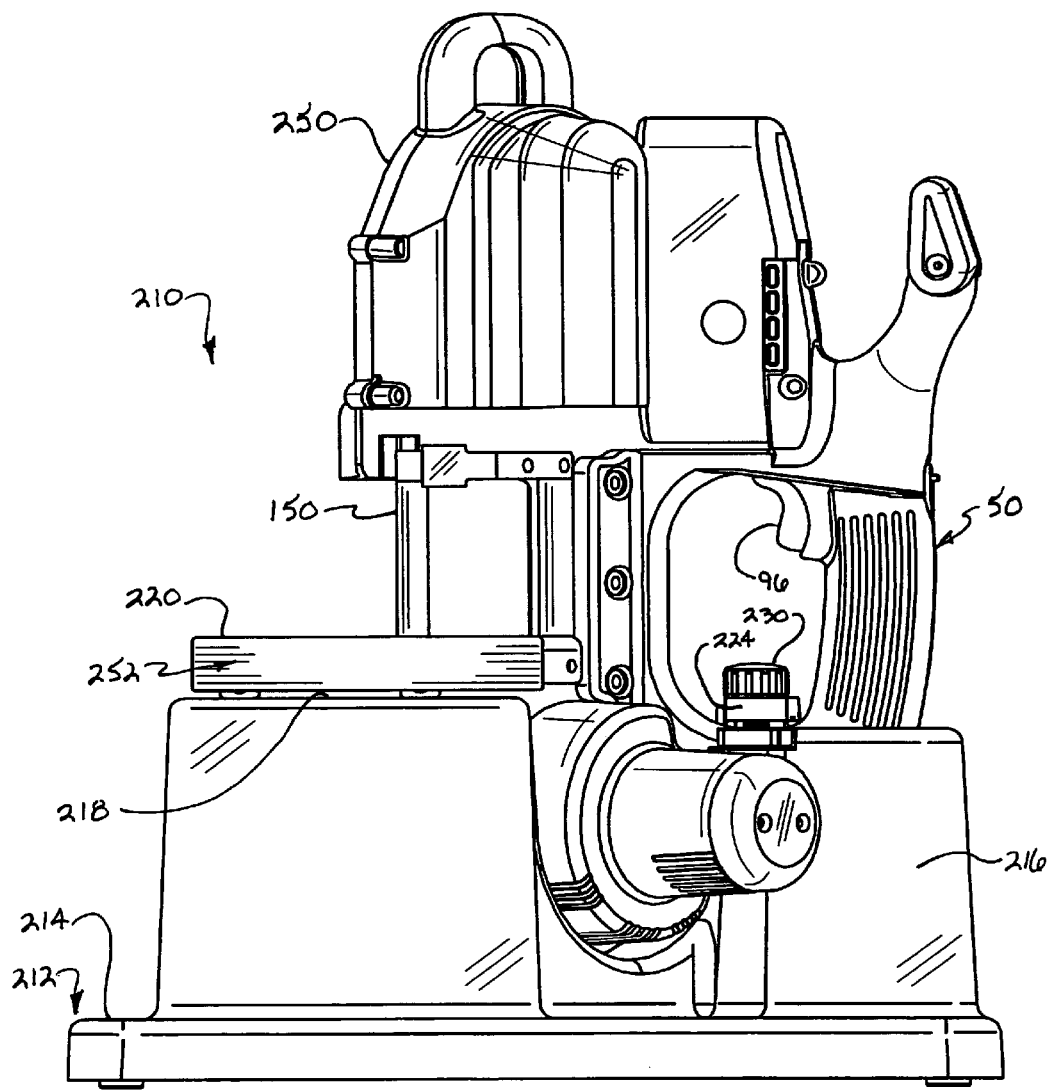
FIG. 5 is a side view of the portable band saw stand and portable band saw combination or kit as illustrated in FIG. 4.
Figure 6:
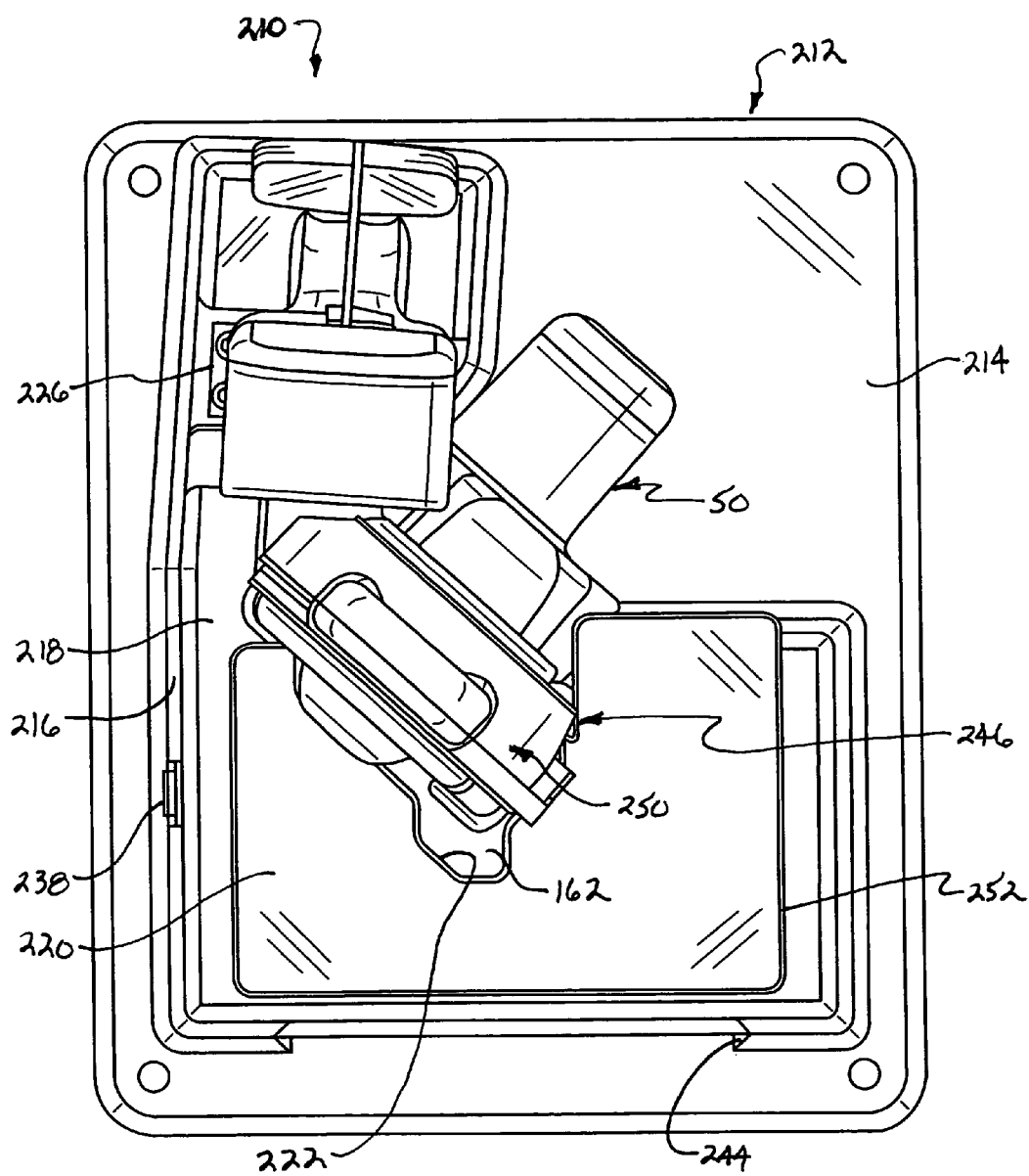
FIG. 6 is plan view of the portable band saw stand and portable band saw combination or kit as illustrated in FIG. 4.

Referring now to FIGS. 4-6, the portable band saw pedestal 210 can include a stand 212 for holding the portable band saw 50 against the force of gravity. The stand 212 can have a relatively flat work piece engaging surface 220, wherein the saw blade 150 projects through a plane of the work piece engaging surface 220. The work piece engaging surface 220 contacts the work piece and provides support for the work piece to be movable across the work piece engaging surface 220 while being fed through the band saw blade 150.

An on/off switch 238 is mounted on the stand 212 for operating the portable band saw 50. The on/off switch 238 is connected to a plug 240 to be engaged with the portable band saw when mounted in supporting relationship to the stand 212. The plug 240 is engagable within a socket 254 of the portable band saw 50. When electrically connected, the plug 240 bypasses a finger trigger 96 of the handle 92 of the portable band saw 50, and creates a circuit through the on/off switch 238 mounted to the stand 212.

The stand 212 can include a foot recess 244 for holding the stand 212 in a stationary position while performing a cutting operation on a work piece with the portable band saw mounted in supporting relationship to the stand 212. The stand 212 includes a contoured recess 246 in an upper surface or top 218 for substantially enclosing a lower portion of the portable band saw 50 to be mounted in a supporting relationship with the stand 212. The contoured recess 246 has a complementary shape or contour with respect to the lower portion of the portable band saw 50 to be engaged therein. The complementary shape or contour of the recess 246 allows a firm, releasable, interference fit between the portable band saw 50 and the stand 212. With the portable band saw 50 fully seated within the contoured recess 246 in the top 218 of the stand 212, a releasable clamp 224 mounted to the stand 212, can be moved from a released position to a clamped position for holding the portable band saw 50 in a stationary position with respect to the stand 212. A metal plate 252 can be provided connected to the top 218 of the stand 212, if desired, to define the relatively flat work piece engaging surface 220. A housing cover 250 can be provided, if desired, to fit over at least one pulley mounted on the portable band saw 50 to afford protection for a user of the band saw. The housing cover 250 can be shaped with a complementary contour to fit over the outer end of the band saw 50 when mounted in supporting relationship with the stand 212. The housing cover 250 can extend along the non-exposed portion of the band saw blade 150 to prevent excursion of the band saw blade 150 from the continuous loop path mounted on the drive and driven pulleys of the band saw.

It should be recognized that the stand 212 and the portable hand-held power operated band saw can be sold individually, or can be sold together as a kit for use in combination with one another. When sold as a kit, or used in combination with one another, the portable band saw 50 can be assembled or mounted into the contoured recess 246 of the stand 212 as shown in FIGS. 4-6. For better understanding of the operation of the portable band saw 50 when used separately from the stand 212, the portable band saw 50 is illustrated and described with respect to FIGS. 7-10 below.

In operation a method for mounting the portable band saw 50 in a stand 212 according to an embodiment of the present invention includes providing a portable hand-held power operated band saw 50 manipulable by hand so as to be movable in relation to a work piece. The band saw 50 can have a substantially continuous cutting edge on at least one edge of the saw blade 150. The saw blade 150 can be movable in a path defined by the closed loop during the cutting operation. The method can also include providing a stand 212 having a relatively flat work piece engaging surface 220. The saw blade 150 projects through a plane of the work piece engaging surface 220. The work piece engaging surface 220 contacts the work piece and provides support for the work piece to be movable across the work piece engaging surface 220 while being fed through the saw blade 150. The method also includes inserting the portable band saw 50 into supporting relationship with respect to the stand 212 with the portable band saw 50 located within the complementary shaped recess 246 formed in the stand 212.

The method for mounting can also include clamping the portable band saw 50 in a stationary position with respect to the stand 212 after insertion within the complementary shaped recess 246. The band saw can be operated with an on/off switch 238 connected to a plug 240 engaged by the band saw 50 when mounted in supporting relationship to the stand 212. The plug 240 can be engaged within a socket 254 of the portable band saw 50 and can be electrically connected to disable a finger trigger 96 of the portable band saw 50 while creating a circuit through the on/off switch 238 mounted to the stand 212. The method can include performing a cutting operation on the work piece with a closed loop saw blade 150. The stand can be held in a stationary position with a foot of the user positioned within a foot recess 244 formed in the stand 212 while performing the cutting operation on a work piece. If desired, the method can include enclosing a portion of the closed loop saw blade 150 extending above the stand 212 with a guard shaped to fit over at least one pulley mounted on the band saw 50 to afford protection for a user of the band saw 50.

Referring to FIGS. 7-10, there is shown a portable hand-held power operated band saw 50. An example of one such band saw is disclosed in U.S. patent application Ser. No. 10/776,838, entitled Hand-Held Band Saw, filed on Feb. 11, 2004. The Ser. No. 10/776,838 patent application is incorporated herein by reference in its entirety.

For purpose of the following description, the terms "upper," "lower," "left," "rear," front," "vertical," "horizontal" and derivatives or formatives of such terms shall relate to the invention as oriented in each of the respective drawing figures. The invention may assume various alternative orientations and embodiments, except where expressly specified to the contrary. Moreover, the specific devices and processes illustrated in the attached drawings, and described in the following text, are simply one embodiment of the concept. Specific dimensions and other physical characteristics of the invention are not to be considered limiting unless expressly stated otherwise as being crucial. It is also the inventor's intention the terms "wheel," "pulley," "roller," or "rotary actuator" may be used interchangeably to refer to components capable of rotating, pivoting or swiveling, fully or partially, about a predetermined axis to convert rotary motion to linear motion to an associated or connected component.

FIGS. 7-10 illustrate an embodiment of the portable band saw manufactured using any known machining or molding techniques. The portable band saw 50 includes the chassis 52 defined by the saw deck 54 and one half of the handle assembly 56 are formed as a unitary and integral unit. In one embodiment, the chassis 52 may be machined from a billet of aluminum. Preferably, the saw deck 54 and portion of the handle assembly 56 are formed by a process of plastic injection molding.

In this embodiment, the saw deck 54 in plan view has a substantially oval configuration defining a first end 58 and an opposite second end 60. The deck assembly 54 includes a deck 62 having a generally C-shaped configuration wherein the gap 64 along one margin or edge of the oval deck 62 forms a throat 64 for receiving the work piece. The deck 62 may be reinforced and made substantially rigid by the integral downwardly depending skirt 66 depending from the periphery of deck 62 as well as ribs, bulkheads or flanges 68 depending from the underside of deck 62 and around throat 64.

In one embodiment, deck 62 and supporting structure may be manufactured from a polymeric material using plastic injection molding techniques. In this instance, rib and bulkheads may be formed as an integral part of the deck 62 to provide a rigid structure. In another embodiment as described above, the deck 62 may also be machined from aluminum or other metal.

In one embodiment on half 90 or other fraction of a handle assembly 92 may be integrally formed with the chassis 52 or deck 62. The handle assembly 92 includes a mating handle shell 94 adapted to mate with handle portion 90. Using the same injection molding method contemplated in the preferred method, appropriate mounting surfaces and structures can be formed in the handle assembly 92 to receive a safety switch and a variable speed trigger 96. In the preferred embodiment, handle assembly 92 is angled relative to deck 62. Most preferably, the plane normal or perpendicular to deck 62 is disposed at an acute angle to a plane substantially parallel to the handle assembly 92. With the handle in this orientation, the center of gravity of the saw is located below the handle and properly positions the saw blade parallel to the handle. In this way, the natural orientation of the user's hand greatly assists in providing better control of the cut.

The handle assembly 92 also includes a slide receiver 98 for receiving a battery 99 thereon (FIG. 7). In the preferred embodiment, the battery receiver 98 is positioned at an end of the handle assembly 92 opposite the motor assembly 76 described below to balance the weight distribution as much as possible. This may be accomplished by altering the moment or length of the battery receiver 98 relative to the handle assembly 92. Anyone of a number of different locking mechanisms may be used to keep the battery 99 on the receiver.

Mounted to the deck 62 of the chassis 52 is the motor assembly 76 described earlier. The motor assembly 76 is what drives a drive wheel assembly 100 positioned below deck 62. The motor assembly 76 includes a bracket attached to the underside of deck 62 and provides a mounting base for fixing the motor assembly 76 to the chassis 52. Once the motor assembly 76 is fixed to the bracket the motor assembly cover 112 is slipped over motor and transmission and coupled to the upper surface of deck 62.

The drive wheel assembly 100 briefly mentioned above includes a drive wheel 114 having an internal gear formed around the interior of the wheel hub and adapted to engage gear fixed to output shaft.

The driven wheel assembly 124 mounted toward the opposite end of the chassis 52 includes a pulley or wheel 126 journaled to a post 128 extending from the carriage of the tensioning assembly 84 disposed in sliding position within the generally rectangular recess. A fastener 132 and spacers/washers 134 are used to retain the driven wheel 126 in free spinning engagement on the tensioning assembly 84.

The driven wheel 126 can be rotated or otherwise translated between a first and a second position relative to the drive wheel 114 through the tensioning assembly 84 located at one end of the saw. The carriage includes a structure at one end which is intended to stabilize the relative position of one end of a compression spring or other biasing mechanism 138. The cam shaft, carriage and biasing member 138 are retained within the recess by a cover plate 146 which is fastened to deck 62, and contains a port through which the upper end of cam shaft extends to be attached to a cam handle 148. Rotation of the cam handle 148 rotates cam shaft and engages or disengages the cam pin with carriage 132 and translating the carriage 132 toward or away from the biasing member 138.

As suggested in the foregoing text, the saw of this invention is a hand-held band saw. In a preferred embodiment, the continuous loop blade 150 may be changed to accommodate substantially any material ranging from steel or iron, plastics, or woods. The distance between the drive wheel and driven wheels is reduced by adjusting the biasing member 138. The desired blade is placed at least partially around the drive and driven wheels and the biasing member 138 is released to place the blade in tension. To properly orient the section of the continuous loop blade 150 at the proper angle as it traverses throat 64, bearings 152 and 154 are mounted at the distal ends of brackets 156 to engage the side of the blade 150. Although not shown, spacers may be used to adjust the position of the bearings 152 and 154. The brackets 156 are preferably "dog-legged" at a predetermined angle which that the bearings 152, 154 at the end engage opposite sides of the continuous loop blade and deflect the section of the blade 150 traversing the throat may be substantially parallel to the plane of the handle assembly 92.

In one embodiment of the invention, provision is made to break worn-out or defective blades in order to reduce the risk of injury to a user as a result of the weakened blade. This is accomplished with the aid of a blade break assembly mounted to the underside of deck 62 just ahead of the up-take portion of the drive wheel 114. In cases where a worn or cracked blade is running on the invention, the blade will tend to wander over the surface of the drive and driven wheels in large part because of a minor change in the blade length. As the blade migrates, it will eventually engage the blade break assembly before a substantial portion of the toothed edge of the blade exceeds the height of the skirt 66. When the blade engages the break, the worn portion is stressed by the break more than any other section and leading to an intentional failure. It is envisioned the blade break may assume different configurations. In one embodiment, the blade bread may take the form of a bearing mounted on a post positioned to engage the cutting edge of the blade as it migrates from the wheels. Other structures may also be used to intentionally stress the blade and cause it to release to prevent any injury or damage.

Another aspect of the invention includes a fence 162 extending from one side of the throat 64 to aid the user in stabilizing the saw and making a more precise cut. In a preferred embodiment of the invention, the angle the fence extends downwardly from deck 52 is substantially parallel to the orientation of the blade section traversing the throat and the plane of the handle.

As suggested earlier in this description, an important object of the invention is providing the capability of the cutting power of a band saw literally in one hand of a user. With this invention, the user can easily carry the saw to essentially any location to cut certain types of stock to length. The invention was originally intended to cut metal conduit but it can easily be adapted to cut other material. In order to function as desired, the only limitation is that the stock should fit within the throat area. In most instances, it is envisioned the user will grasp the saw in one hand and position or stabilize the stock with the other hand. The user will depress the safety switch and then depress the trigger to turn on the saw. The user may pre-align the blade before starting the cut, or align the blade after starting the blade rotation to initiate the cut. To stabilize the stock or work piece, the user can rest the stock against the fence while the blade is cutting the stock.

In operation, the instant invention is used in a manner which is ergonomically much more natural than prior band saws. First the operator is able to easily hold the saw using a single hand rather than prior band saws where the handle is positioned at an extreme end of the saw body. This one-handed operation is not merely attributable to scale, but to the position and orientation of the handle assembly along the upper end of the saw so the user can keep the saw close to the user's body as compared to previous devices requiring support away from the user's body. Moreover, an offset of the mass of the motor assembly by the mass of the battery pack naturally orients and balances the saw in an appropriate and ergonomically comfortable position. This aspect also naturally orients the throat area 64 of the saw to engage the work piece.

The method of using the inventive saw having a throat along one edge for receiving the work piece and traversed by a continuous loop blade includes grasping the handle extending from an upper edge of the saw opposite the throat area with one hand. The user is then free to orient or stabilize the work piece with the other hand. The user may also fix the work piece with clamps or the like before hand without the need to later stabilize the free hand. The user activates or energizes the saw by first depressing the safety switch disposed in the handle assembly, and then depressing the trigger also located in the handle assembly. This provides power to the motor and results in rotation of the continuous loop blade to pass through the throat area. The user is then able to engage the work piece by the blade to make the cut. To help in the cutting operation, the user can permit the work piece to be restrained by the fence to make a better cut. Because of the position of the center of gravity is generally in a line passing through the user's hand and forearm, the user is able to easily orient the saw to make cuts in a vertical or overhead position.

This alignment of the center of gravity is closer to the axis of the user's forearm and hand making it more ergonomic to control. This also frees the second hand of the user to orient, adjust or stabilize the position of the work piece to complete the cut in a smooth and efficient manner.

The method of using the instant invention also includes the manner for driving the continuous loop blade. The motor assembly 76 described above includes a reduction gear attached to one end of the motor. As suggested by the comparent name, the reduction gear or transmission changes the rpm of the output shaft from the rpm produced by the motor. The gear attached to the end of the transmission engages the internal gear on the interior of the drive wheel 114. The gear ratios are such that the desired blade speed is achieved. If desired, a variety of gear combinations can be provided using different reduction combinations. Alternatively and as anticipated in one form of the invention, the speed of the cutting blade can be varied using a variable speed trigger assembly as is used in other tools.

Modifications in addition to those outlined above may occur to those skilled in the art or to those who make or use the invention. Such modifications may include substitution of the battery with a power cord for connecting to an AC source. The change in power source will also require a change in the electrical components so they are compatible. Other modifications may change the blade tensioning mechanism from one that is naturally relaxed to one that is naturally in the extended position. Additional modifications to the instant invention may also include the ability to quickly adjust the deflection angle of the continuous loop blade. The range of adjustment may vary from small adjustments to much larger scale changes. One example for doing so may be by providing a pivoting arm on the guide assembly or bracket 156 such that the angle of the bearings may be adjusted. This may be advantageous if the center of gravity is altered by using batteries of different mass or the user wishes to increase the depth of the throat area by changing the natural cutting angle of the saw. Thus the embodiment described above is merely illustrative.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A portable band saw support stand for use in the selected receipt and removable engagement and operation of a portable hand-held band saw, the support stand comprising:
    a base;
    at least one outer side wall connected to the base;
    a substantially planar work piece support surface connected to the outer side wall, the work piece support surface defining an opening of a band saw substantially enclosing contoured mounting recess;
    an elongate contoured circumferential inner wall extending downward from the support surface and connecting to the base defining the contoured mounting recess, the contoured circumferential inner wall substantially enclosing in complimentary surrounding orientation a portion of a circumferential outer peripheral surface of a lower portion of the band saw, and substantially enclosing a band saw lower end along substantially an entire length of the contoured circumferential inner wall on selective and removable installation of the band saw in the contoured mounting recess, the support surface further having a through opening defining an operational cutting blade path transverse to the support surface in communication with the mounting recess;
    a plug having a plurality of prongs connected to the base and extending upward into the contoured mounting recess; and
    a power switch mounted on the at least one outer side wall or the base and in electrical communication with the pronged plug, the switch adapted to selectively supply power to the band saw when the saw is selectively positioned and operatively engaged with the plug in the mounting recess.

2. The support stand of claim 1 wherein the plug is fixedly connected to the base extending rigidly upwardly into the contoured mounting recess, wherein on selected operable and electrical engagement of the saw into the mounting recess and direct electrical connection between a saw electrical socket with the plug prongs, the support stand is operative to selectively supply electrical and operative power to the saw through the power switch.

3. A portable band saw support stand for use in operational support of a portable hand-held band saw having an end positioned along a longitudinal axis of the saw, the support stand comprising:
    a base;
    a substantially planar work piece support surface separated from the base by a vertically extending outer sidewall, the outer sidewall and the base defining a contoured mounting recess having an elongate inner circumferential wall extending transversely and longitudinally downward from the work piece support surface connecting to the base, the inner circumferential wall and recess positioned and oriented for a substantially enclosing, surrounding and complementary, interference fit with a lower portion and lower end of the band saw inserted into the contoured mounting recess along a substantial length of the inner circumferential wall, the work piece support surface further having a saw blade opening longitudinally through the planar surface in communication with the contoured recess defining saw blade cutting path through the opening;
    an electrical plug fixedly connected to the base having at least two prongs extending upwardly into the contoured recess and adapted for direct electrical connection and communication with the band saw when the band saw is selectively installed in the stand contoured recess; and
    a power switch mounted on one of the base or outer sidewall in electrical communication with the plug, wherein on selective installation of the band saw in the stand contoured recess and engagement of the plug prongs with the band saw, the switch is adapted to selectively actuate the band saw independent of a power trigger resident on the band saw.

\* \* \* \* \*